(12) United States Patent
Berger

(10) Patent No.: US 7,059,636 B2
(45) Date of Patent: Jun. 13, 2006

(54) SEAT BELT POSITIONING DEVICE

(75) Inventor: Russell Berger, Needham, MA (US)

(73) Assignee: SKJP Holdings, LLC, Naples, FL (US)

( * ) Notice: Subject to any disclaimer, the term of this patent is extended or adjusted under 35 U.S.C. 154(b) by 320 days.

(21) Appl. No.: 10/605,295

(22) Filed: Sep. 19, 2003

(65) Prior Publication Data

US 2004/0104569 A1   Jun. 3, 2004

Related U.S. Application Data

(60) Provisional application No. 60/413,790, filed on Sep. 26, 2002, provisional application No. 60/468,361, filed on May 6, 2003.

(51) Int. Cl.
*B60R 22/00* (2006.01)

(52) U.S. Cl. .................. 280/808; 297/468; 297/483

(58) Field of Classification Search ............. 280/801.1, 280/808; 297/468, 483, 484, 486
See application file for complete search history.

(56) References Cited

U.S. PATENT DOCUMENTS

| | | | |
|---|---|---|---|
| 3,101,517 A | 8/1963 | Fox et al. ........................ 24/204 |
| 3,266,113 A | 8/1966 | Flanagan, Jr. ................. 24/204 |
| 3,359,003 A | 12/1967 | Kass ............................ 273/131 |
| 3,688,348 A | 9/1972 | Klotz et al. ..................... 24/16 |
| 3,860,261 A | 1/1975 | Takada ......................... 280/150 |
| 4,247,967 A | 2/1981 | Swinton ....................... 24/143 |
| 4,609,205 A | 9/1986 | McKeever ................... 280/808 |
| 4,672,722 A | 6/1987 | Malamed ..................... 24/446 |
| 4,832,367 A | 5/1989 | Lisenby ....................... 280/808 |
| 4,938,535 A | 7/1990 | Condon et al. .............. 297/483 |
| 4,946,198 A | 8/1990 | Pittore et al. ................ 280/808 |
| 5,080,396 A | 1/1992 | Vacanti ........................ 280/808 |
| 5,135,257 A | 8/1992 | Short ........................... 280/808 |
| 5,215,333 A | 6/1993 | Knight .................... 280/801 R |
| 5,265,910 A | 11/1993 | Barr et al. ................... 280/808 |
| 5,417,455 A | 5/1995 | Drinane et al. .............. 280/808 |
| 5,537,723 A | 7/1996 | Yoshida et al. ................ 24/452 |
| 5,570,933 A | 11/1996 | Rouhana et al. ............ 297/483 |
| 5,605,380 A | 2/1997 | Gerstenberger ............. 297/483 |
| 5,664,844 A * | 9/1997 | Greene ........................ 297/485 |
| 5,676,426 A * | 10/1997 | Herring ....................... 297/484 |
| 5,678,887 A | 10/1997 | Sher ......................... 297/250.1 |

(Continued)

FOREIGN PATENT DOCUMENTS

DE          3830925          3/1990

(Continued)

*Primary Examiner*—Paul N. Dickson
*Assistant Examiner*—Toan C. To
(74) *Attorney, Agent, or Firm*—Barlow, Josephs & Holmes, Ltd.

(57) ABSTRACT

An adjustable seat belt device for positioning a shoulder belt relative to a lap belt of a passenger restraint system includes an elongated strap. A first fastening element is attached to the first end of the elongated strap where the first fastening element is removably engageable with the lap belt of a passenger restraint system. A second fastening element is adjustably attached to the second end of the elongated strap where the second fastening element is removably engageable with the shoulder belt of a passenger restraint system. A length of loop material is provided in the gap between the leading edge of the flap and the plate to prevent the exposed fasteners from catching on clothing, and the like.

11 Claims, 10 Drawing Sheets

U.S. PATENT DOCUMENTS

| | | | |
|---|---|---|---|
| 5,692,271 A | 12/1997 | Provost et al. | 24/452 |
| 5,733,004 A | 3/1998 | Celestina-Krevh et al. | 297/250.1 |
| 5,733,014 A * | 3/1998 | Murray | 297/485 |
| 5,839,792 A | 11/1998 | Baik | 297/483 |
| 5,997,522 A | 12/1999 | Provost et al. | 604/391 |
| 6,017,094 A | 1/2000 | Syick | 297/482 |
| 6,035,498 A | 3/2000 | Buzzell et al. | 24/452 |
| 6,203,110 B1 * | 3/2001 | Proteau et al. | 297/483 |
| 6,293,589 B1 | 9/2001 | MacDonald et al. | 280/808 |
| 6,322,149 B1 * | 11/2001 | Conforti et al. | 297/482 |
| 6,438,247 B1 * | 8/2002 | Cipolla et al. | 381/365 |
| 6,467,790 B1 * | 10/2002 | Hurley | 280/480 |
| 6,543,099 B1 | 4/2003 | Filion et al. | 24/452 |
| 6,893,098 B1 * | 5/2005 | Kohani | 297/468 |

FOREIGN PATENT DOCUMENTS

| | | |
|---|---|---|
| FR | 2674803 | 10/1992 |
| JP | 62-053268 | 3/1987 |
| JP | 04-146852 | 5/1992 |
| WO | WO 93/21044 | 10/1993 |

* cited by examiner

SEAT BELT POSITIONING DEVICE

CROSS REFERENCE TO RELATED APPLICATIONS

This application claims priority from prior U.S. Provisional Application Ser. No. 60/413,790, filed on Sep. 26, 2002 and U.S. Provisional Application Ser. No. 60/468,361, filed on May 6, 2003.

BACKGROUND OF INVENTION

The present invention relates generally to belt positioning devices. More specifically, the present invention relates to devices suitable for positioning seat belts, namely shoulder belts, in a passenger restraint system such as a lap belt and shoulder belt system. In addition, the present invention relates to the positioning of the shoulder belt to make the restraint system more comfortable and safe for the passenger therein.

In the prior art, it is well known in the vehicle industry that passengers are secured to a seat for safety purposes. In automobiles, for example, the seat belt safety system includes a lap belt that spans across the lap of the passenger as well as a shoulder belt that spans from above a shoulder of the passenger and across the chest to the opposite side thereof to a position proximal to one end of the lap belt. There is a problem in these known shoulder belts in that they are difficult to adjust to the size and shape of the passenger so that it is most comfortable while providing the most amount of safety. This problem is particularly exacerbated with passengers that are small in stature, such as children. More specifically, the shoulder belt commonly rides too high on smaller passengers so it will tend to dig into the neck of the passenger making the seat belt restraint system very uncomfortable and even unsafe to use.

There have been attempts in the prior art to provide a means for adjusting the shoulder and lap belts found in vehicles. For example, many cars include a slide lock adjustment of the connection point of the shoulder belt where it connects to the vehicle above the shoulder of the passenger. Adjusting this connection point changes the angle of the shoulder belt to accommodate passengers of different sizes. However, the range of adjustment is minimal and, most notably, does not adjust nearly enough to accommodate passengers that are very small in size, such as children. Further, in a prior art attempts to solve this problem, the shoulder belt is connected directly to a center portion of the lap belt. This results in unwanted disruption, namely bowing, of the lap belt which increases the likelihood of the child sliding completely under the lap belt during a collision. As a result, the passenger can easily "submarine" underneath the lap belt causing a serious safety hazard.

In view of the foregoing, there is a demand for a seat belt positing device that easily retrofits onto the existing seat belt systems found in vehicles, namely, a lap belt and shoulder belt construction. There is also a demand for a seat belt positioning device that can attach to the lap belt near its connection point to the seat to avoid the unwanted and unsafe bowing effect of the lap belt while not sliding along the length of the lap belt. There is a demand for a seat belt positioning device that can be adjustably attached to the shoulder belt to customize the installation to the size and shape of the particular passenger being restrained. There is a further demand for a seat belt positioning device that is compact, inexpensive and easy to operate and install.

SUMMARY OF INVENTION

The present invention preserves the advantages of prior art seat belt positioning devices. In addition, it provides new advantages not found in currently available devices and overcomes many disadvantages of such currently available devices.

The invention is generally directed to a novel and unique seat belt positioning device that can be easily attached to an existing passenger seat belt restraint system in a vehicle, namely, a lap belt and shoulder belt arrangement. The seat belt positioning device can be attached to the existing seat belt restraint system without modifying it any way.

The adjustable seat belt device, for positioning a shoulder belt relative to a lap belt of a passenger restraint system, employs an elongated strap member having a first end, a second end and a face. A first fastening element is attached to the first end of the elongated strap and is removably engageable with a lap belt of a passenger restraint system. The first fastening element preferably includes a plate that is pivotally affixed to the first end of the elongated strap. The plate preferably includes a pair of T-shaped opposing notches capable of threadably receiving the lap belt therethrough. A second fastening element is attached to the second end of the elongated strap. The second fastening element is removably engageable with the shoulder belt of a passenger restraint system. A series of fasteners are disposed on the face of the elongated strap. The elongated strap is foldable so that a first group of engaging fasteners engage with a second group of engaging fasteners to form a loop with the lap belt captured and routed therethrough. As a result, the position of the shoulder belt of the passenger restraint system can be easily adjusted and controlled for added comfort and safety of the passenger.

For installation, the first fastener is attached to region of the lap belt that is opposite to where the shoulder belt meets with the lap belt. In the preferred embodiment, the lap belt is routed through both of the notches in the plate thereby securing a first end of the elongated strap to the lap belt. The second end of the strap is looped under and over the shoulder belt with the shoulder belt moved into a desired, in use, position. The looped portion of the strap is fastened to the remainder of the strap via the fasteners to secure the shoulder belt into its desired position. By the use of fasteners, such as hook and loop fasteners and self-engaging fasteners which are affixed to the face of the elongated strap, the length of the device can be adjusted thereby adjusting the positioning of the shoulder belt.

It is therefore an object of the present invention to provide a positioning device for a shoulder belt of a passenger restraint system.

It is an object of the present invention to provide a seat belt positioning device that can be easily adjusted.

It is a further object of the present invention to provide a seat belt positioning device that positions the shoulder belt lower for added comfort and improved safety of the passenger.

Another object of the present invention is to provide a seat belt positioning device that can retrofit to any existing lap belt and shoulder belt passenger restraint system.

It is a further object of the present invention to provide a seat belt positioning device that is inexpensive to manufacture.

Another object of present invention is to provide a seat belt positioning device that is easy to install and operate.

Another object of the present invention is to provide a seat belt positioning device that is compact and portable.

BRIEF DESCRIPTION OF DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION

Figure 1:
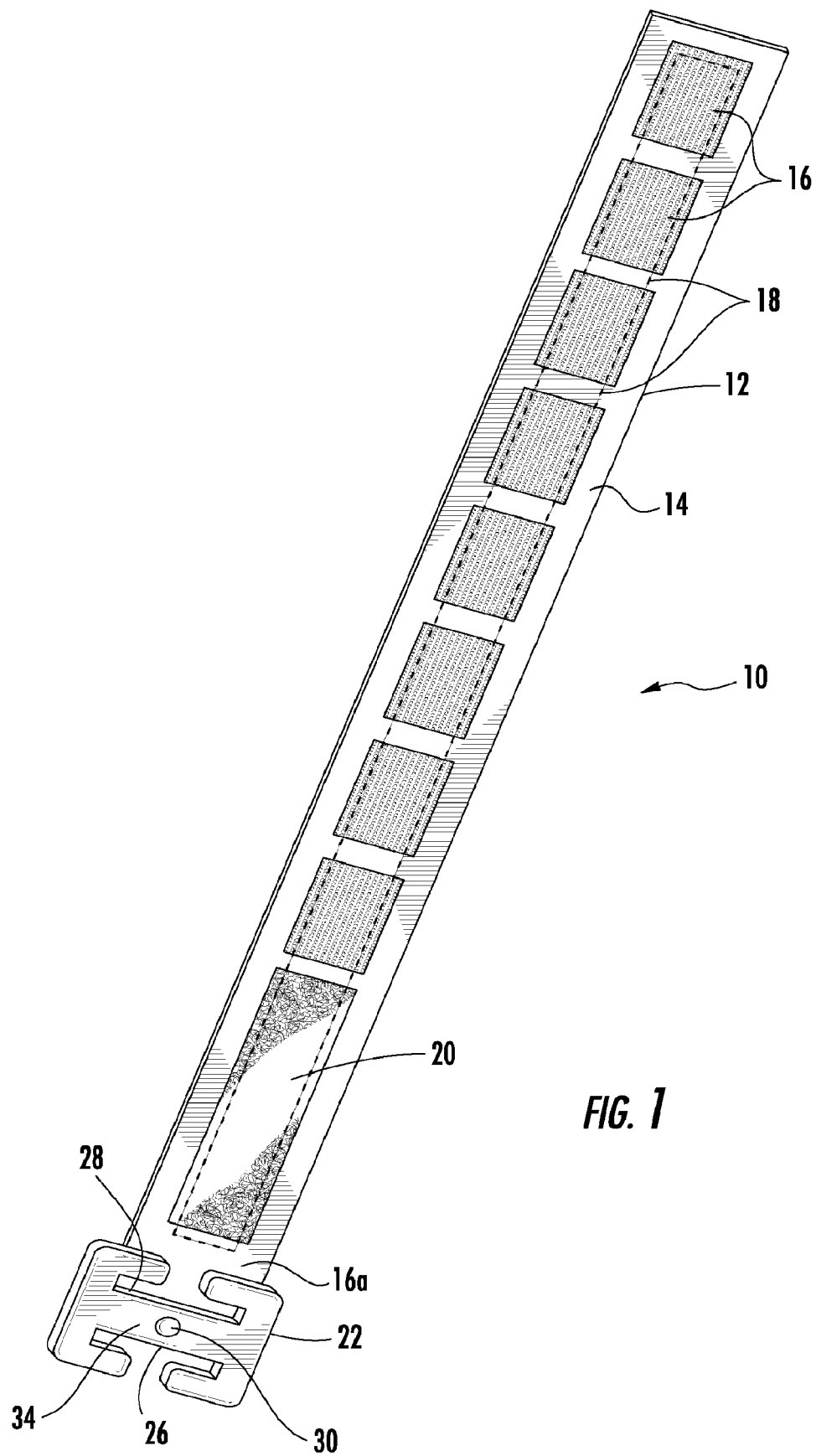
FIG. 1 is a perspective view of the preferred embodiment of the seat belt positioning device of the present invention.
Figure 2:
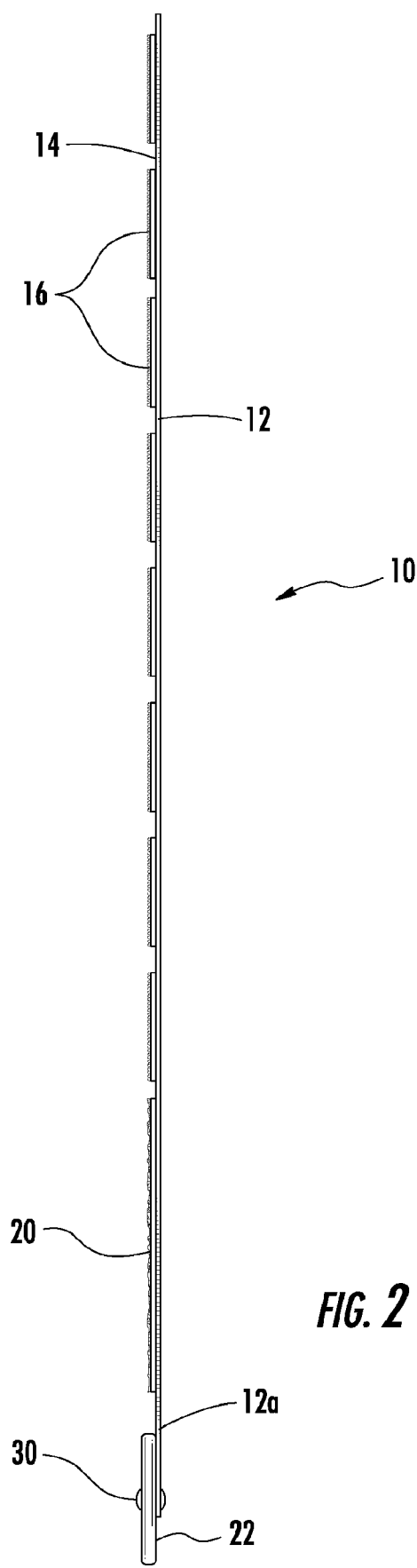
FIG. 2 is a side view of the seat belt positioning device of FIG. 1.
Figure 4:
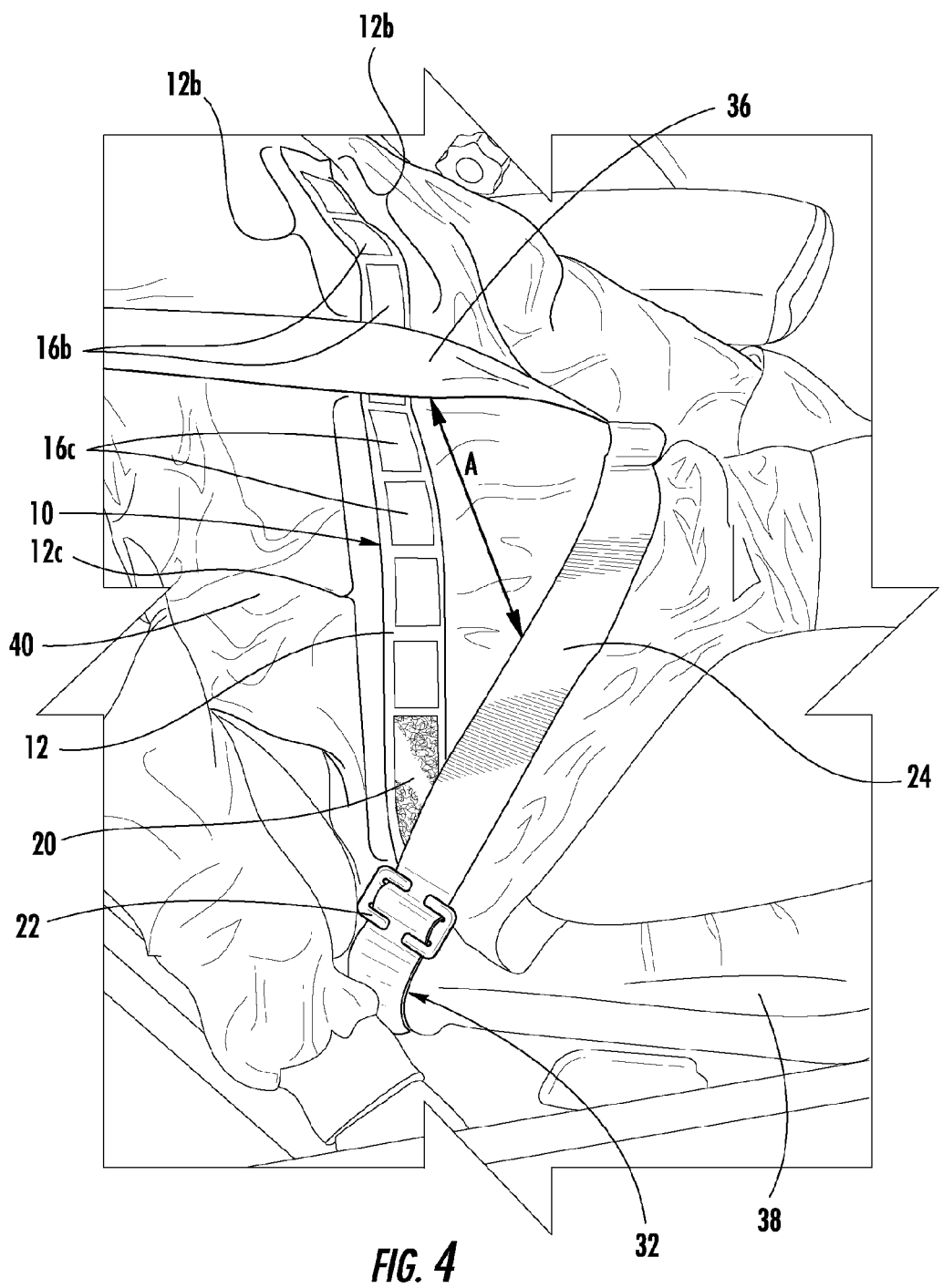
FIG. 4 is a perspective view of the seat belt positioning device of FIG. 1 being adjusted to attach to a shoulder belt of a passenger restraint seat belt system.

Referring first to FIGS. 1 and 2, the preferred embodiment of the seat belt positioning device 10 of the present invention is shown. The seat belt positioning device 10 includes a main body 12 which is preferably semi-rigid flexible elongated strap. The material for the elongated strap 12 may also be similar to the webbing used for lap and shoulder belts in a typical seat belt restraint system for a passenger 40, as seen in FIG. 4. The flexible main body 12 has a first and a second side. On the first side 14, an array of fasteners 16 are affixed for engagement with one another.

In the preferred embodiment of FIGS. 1–5, the array of fasteners 16 are a single column of spaced apart rectangular fasteners 16. Preferably, the fasteners 16 are self-engaging fasteners where any one of the fastener members 16 in the array can attach to any other fastener member 16. The fasteners 16 are preferably sewn, by stitching 18, onto the flexible main body 12 but may be affixed in other ways, such as by an adhesive (not shown). Other fastening structures may be used, such as hook and loop fasteners and snaps (not shown). Details of the interconnection of the fasteners 16 to each other will be described in detail below.

Also, provided on the first side 14 of the elongated strap 12 is preferably a length of loop material 20 which also may be adhered to face 14 by stitches 18. As will be described below in connection with the installation of the seat belt positioner 10, the loop material 20 holds the self-engaging fasteners 16 on the flap of the elongated strap 12 down while providing a surface that cannot catch clothing, and the like.

Figure 3:
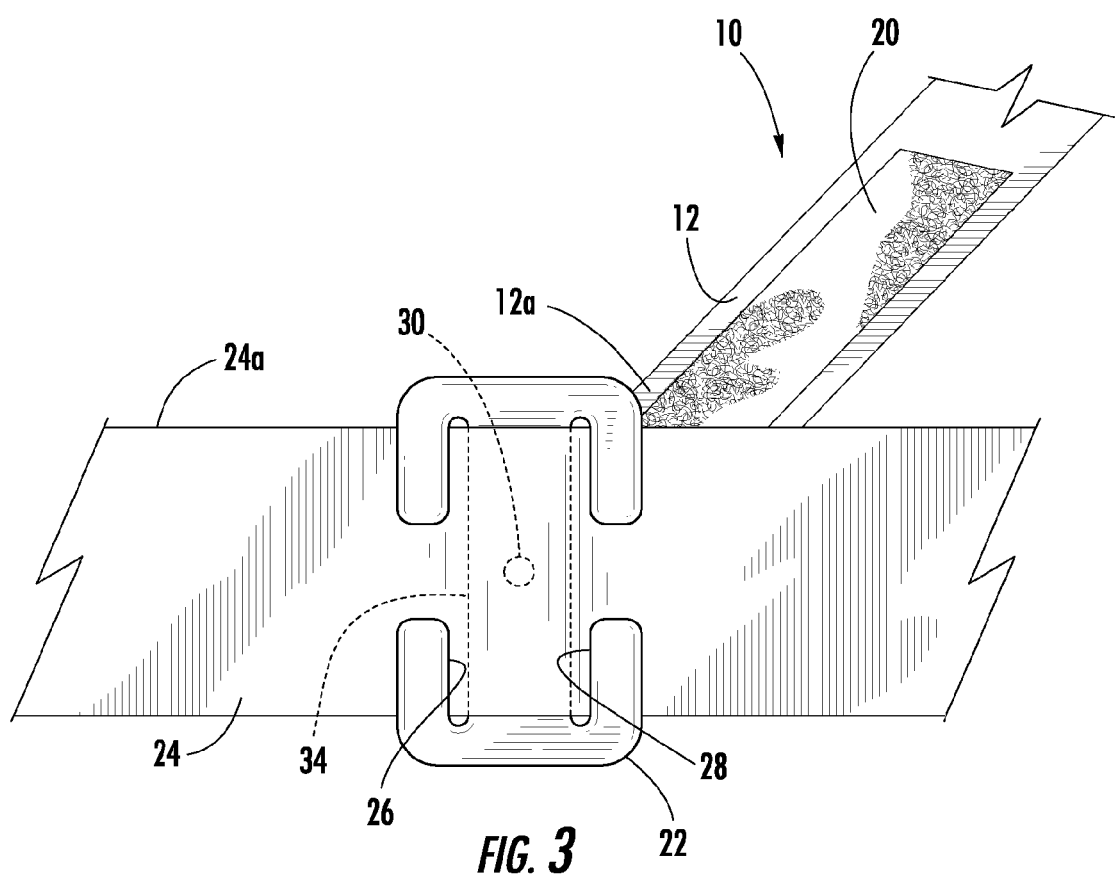
FIG. 3 is a close-up perspective view of the attachment of the seat belt positioning device of FIG. 1 to a lap belt of a passenger restraint seat belt system.

Pivotally attached on the first end of the elongated strap 12 is a lap belt fastener 22. This fastener 22 is used to attach to an existing lap belt 24, as seen in FIG. 3, while not being able to slide along the length thereof. This lap belt fastener 22 is preferably a plate with two opposing T-shaped notches 26 and 28. This plate 22 is preferably metal but also may be made of made of similar material. The plate 22 is riveted to the first end 12a of the elongated strap 12, preferably by a rivet 30 through middle bar 34, so that it can easily pivot. As will be understood, pivoting of the plate 22 enables the seat belt positioner 10 of the present invention to be used on either side of a vehicle and in different directions. Alternatively, a different type of structure to fasten the elongated strap 12 to the lap belt 24 may be used instead. For example, a clamp-like structure or clip (not shown) may be employed to connect onto the lap belt 24.

Figure 5:
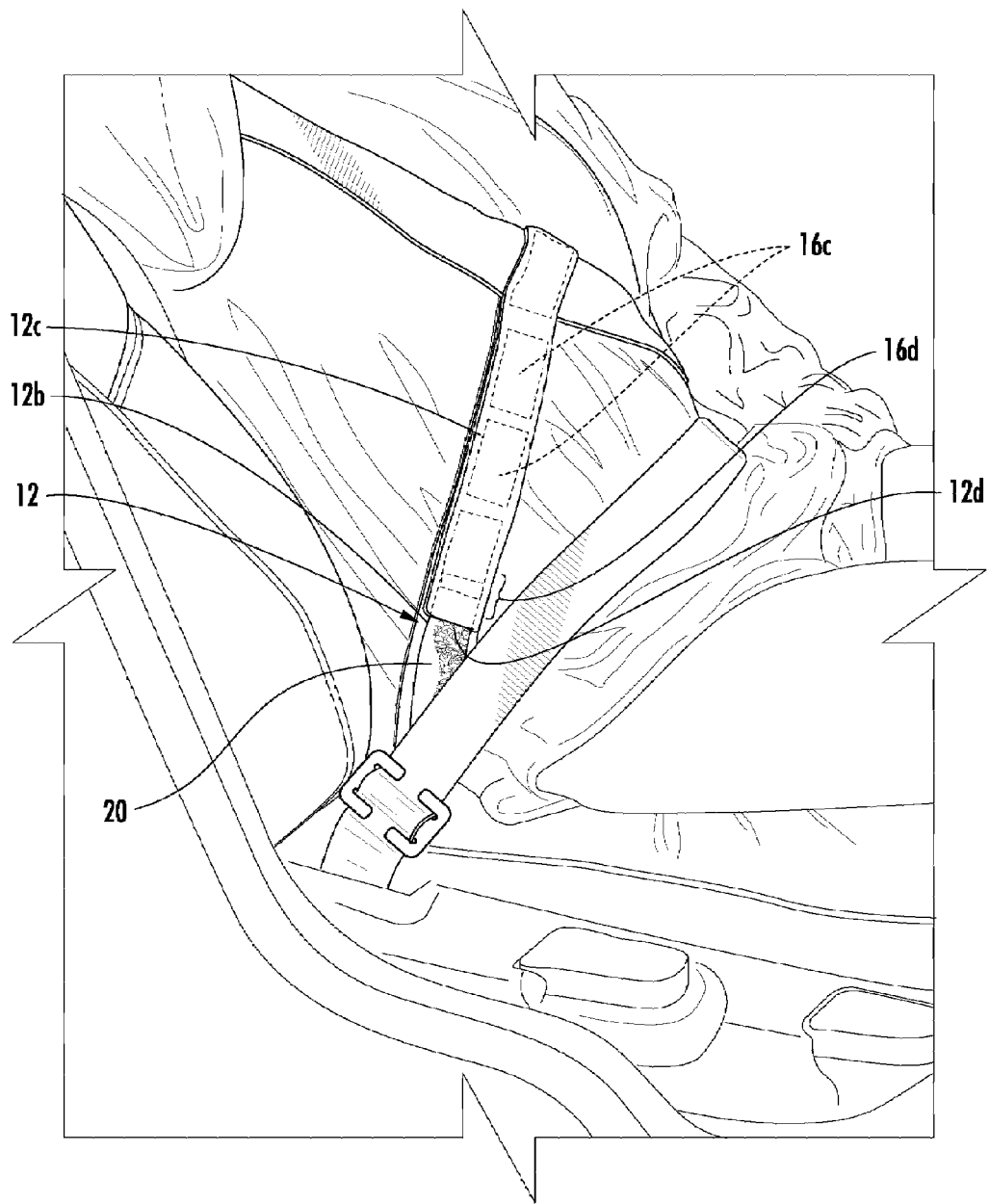
FIG. 5 is a perspective view of the seat belt positioning device of FIG. 1 fully installed onto a passenger restraint seat belt system.

Referring now to FIGS. 3–5, the installation of the seat belt positioning device 10 of the present invention is shown. First, the first end 12a of the elongated strap 12 is secured to the lap belt 24 of the passenger restraint seat belt system, generally referred to as 32 in FIG. 4. The lap belt 24 is folded slightly so that the edges 24a of the lap belt 24 can be routed through notches 26 and 28 in the plate 22. The lap belt 24 can then be unfolded to permit the edges 24a to reside fully in the T-shaped notches 26 and 28 in the plate 22. As a result, the plate 22 is securely attached to the lap belt 24. With the lap belt 24 now routed through the T-shaped notches 26 and 28 and over the middle bar 34, unwanted sliding of the plate 22 along the length of the lap belt 24 can be avoided. As can be seen in FIG. 3, the elongated belt 12 is pivotally connected to the plate 22 via the rivet 30.

FIG. 4 illustrates the positioning of the seat belt positioning device 10 prior to attachment to the shoulder belt 36 which is part of the general passenger restraint system 32. The description herein shows attachment of the device 10 to the left side of a lap belt 24 and up to the left to connect to a shoulder belt 36. In this case, the location would be at the right rear seat 38 or right front seat of a vehicle. It should be understood that the device 10 may be attached in the same fashion where a mirror image arrangement of the lap belt 24 and shoulder belt 36 are provided, such as for a left rear seat or a left front seat (driver's seat). The ability of plate 22 to pivot on the elongated strap 12 about rivet 30 enables the device 10 to be installed anywhere in a vehicle.

Still referring to FIG. 4, the elongated strap 12 is routed underneath the shoulder belt 36 with the fasteners 16 facing upwards. The desired downward deflection of the shoulder belt 36 is, as indicated by arrow A, selected according to the comfort level of the passenger 40. For example, a small child may desire the length A to be shorter than for a larger child. With the desired amount of positioning of the shoulder belt 36 relative to the lap belt 24, the portion 12b of the elongated strap 12 that extends above the shoulder strap 36 is flapped over onto main body portion 12c of the elongated strap 12, as seen in FIG. 5. The fasteners 16c on flap portion 12c of the face 14 of the elongated strap 12 engage with matching fasteners 12b on the main body 12c of the elongated strap 12. Of course, the size of the flap 12c and the main portion 12b of the elongated strap 12 will change depending on the overall installed length of the device 10 to achieve the desired amount of positioning of the shoulder belt 36. The device 10 can be easily adjusted by disengaging the fasteners 16 from each other, changing the length A of main portion 12c of strap 12, and then re-fastening the fasteners 16 at the new desired position.

In FIG. 5, the engagement of the fasteners 16 is shown. The device 10 of the present invention further includes loop fastening material 20 in a region on the face 14 of the elongated strap 12 between the plate 22 and the self-engaging fasteners 16. The loop material 20 improves the overall operation of the seat belt positioning device 10 because it helps to secure the flap portion 12b of the elongated strap 12 to the main portion 12c while not being susceptible to catching clothing thereon. More specifically, it is possible to have self-engaging fasteners 16 that run the entire length on the face 14 of the elongated strap 12. However, the strap 12 is configured to be different lengths according to the passenger size thus resulting in different amounts of fasteners 16 being exposed. In the likely event that some of the fasteners 16 are exposed between the leading edge 12d of the flap 12b and the plate 22, it is common for clothing, such as sweaters and shirts, to catch onto the self-engaging fasteners 16 which is, obviously, undesirable.

Therefore, there is desire to protect the gap between the edge 12d of the flap 12b and the fastener plate 22. To address this, the present invention provides the length of loop fastening material 20 in the general gap region which would be between the leading edge 12d of the flap 12b and the plate 22. When the flap 12b is secured to the main portion 12c of the elongated strap 12, a leading portion 16d of the fasteners 16 under the flap 12b communicate with the loop material 20. With this communication, the fasteners 16 under the leading portion of the flap 12b engage with the loop material 20 to secure the flap 12b fully in place. The loop material 20 is specifically used in this marginal region because it can engage with the self-engaging fasteners 16 but will not engage with clothing because it includes closed loops. However, self-engaging fasteners 16 are still desired on the majority of the face 14 of the strap 12 because it is a stronger connection than the self-engaging fasteners 16 to the loop material 20.

Figure 6:
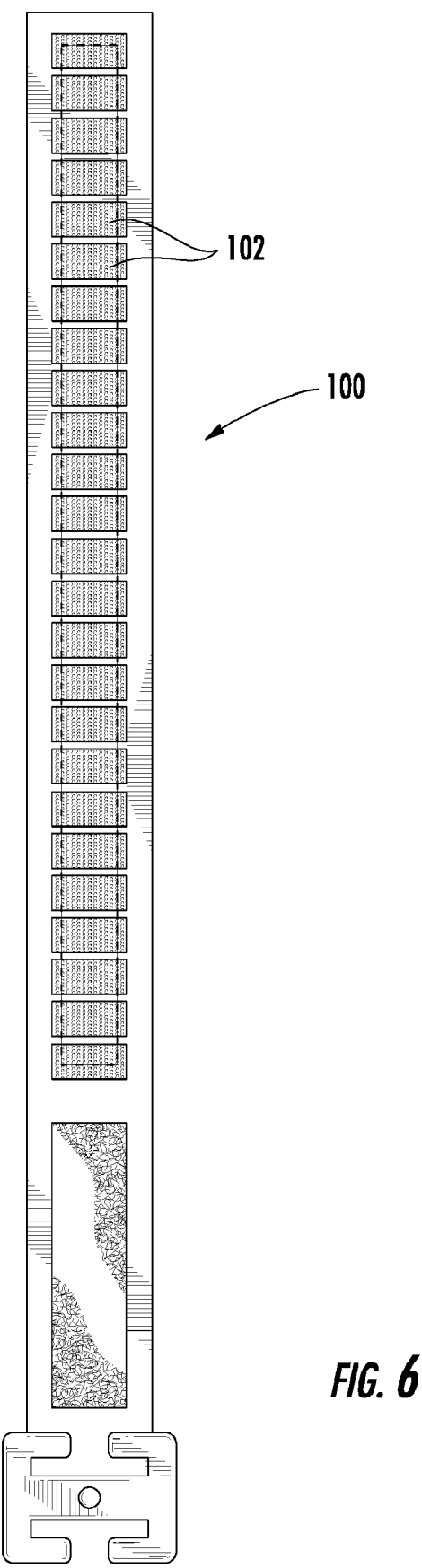
FIG. 6 is an alternative embodiment of the seat belt positioning device in accordance with the present invention with horizontally oriented rectangular fasteners.
Figure 7:
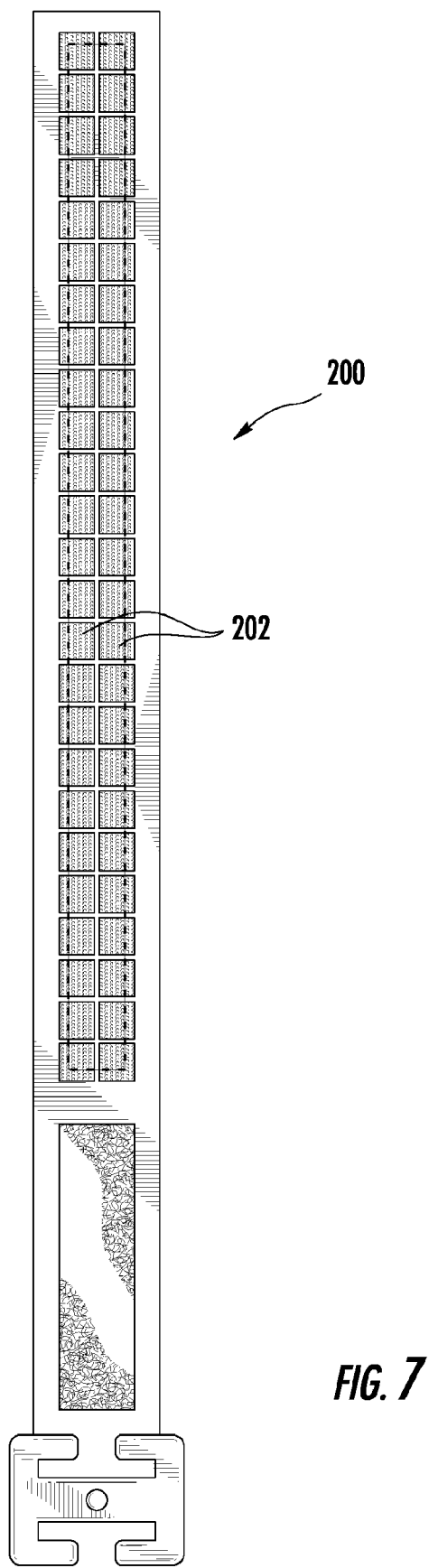
FIG. 7 is a further alternative embodiment of the seat belt positioning device in accordance with the present invention with two columns of square fasteners.
Figure 8:
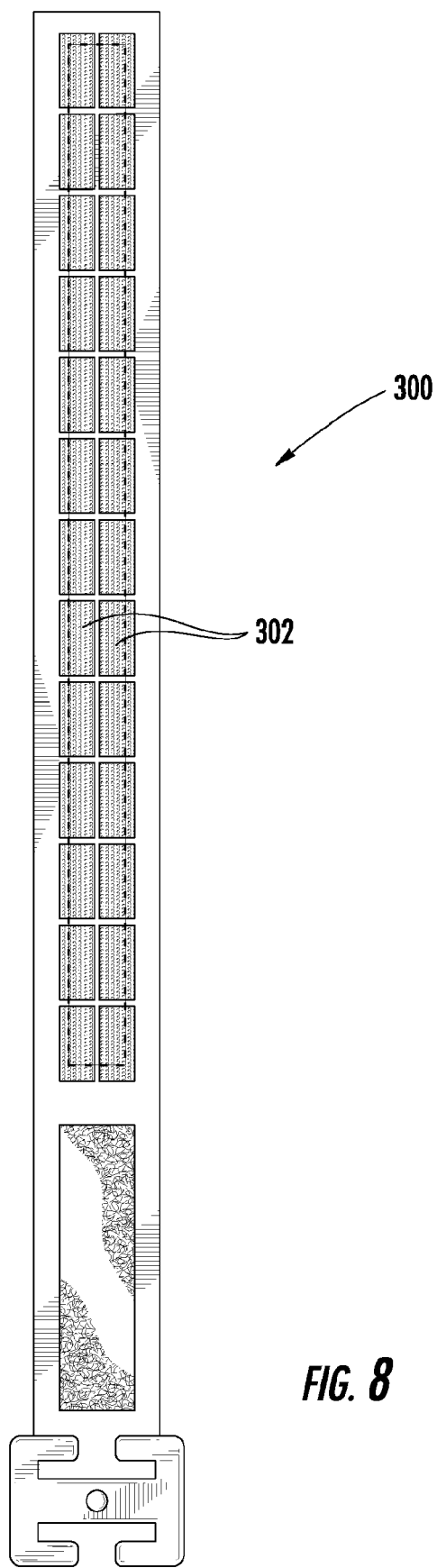
FIG. 8 is a further alternative embodiment of the seat belt positioning device in accordance with the present invention with two columns of vertically oriented rectangular fasteners.
Figure 9:
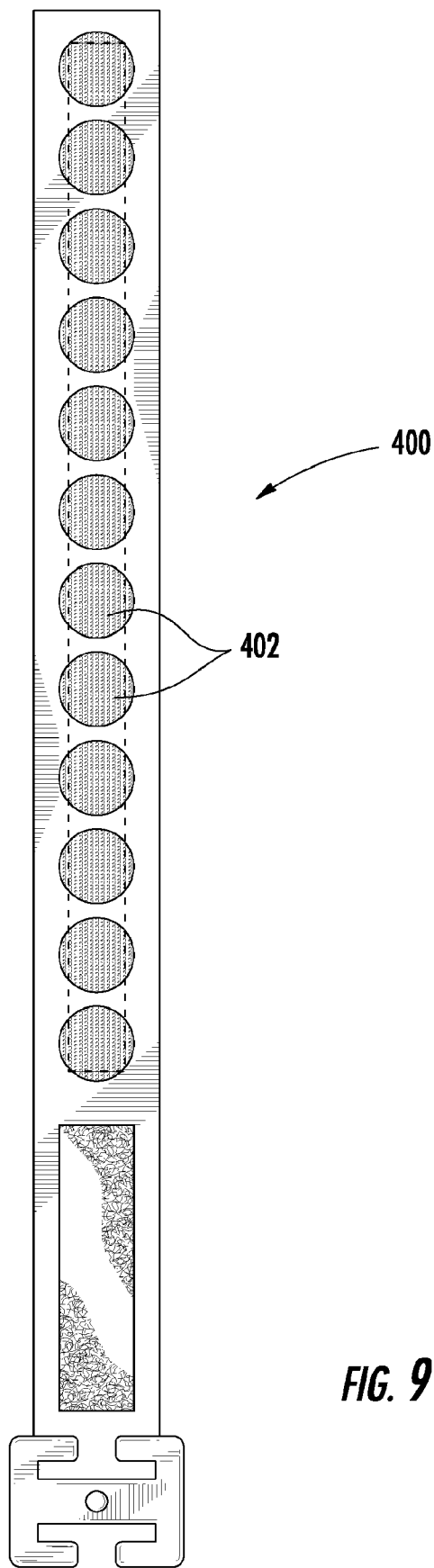
FIG. 9 is a further alternative embodiment of the seat belt positioning device in accordance with the present invention with one column of round fasteners.
Figure 10:
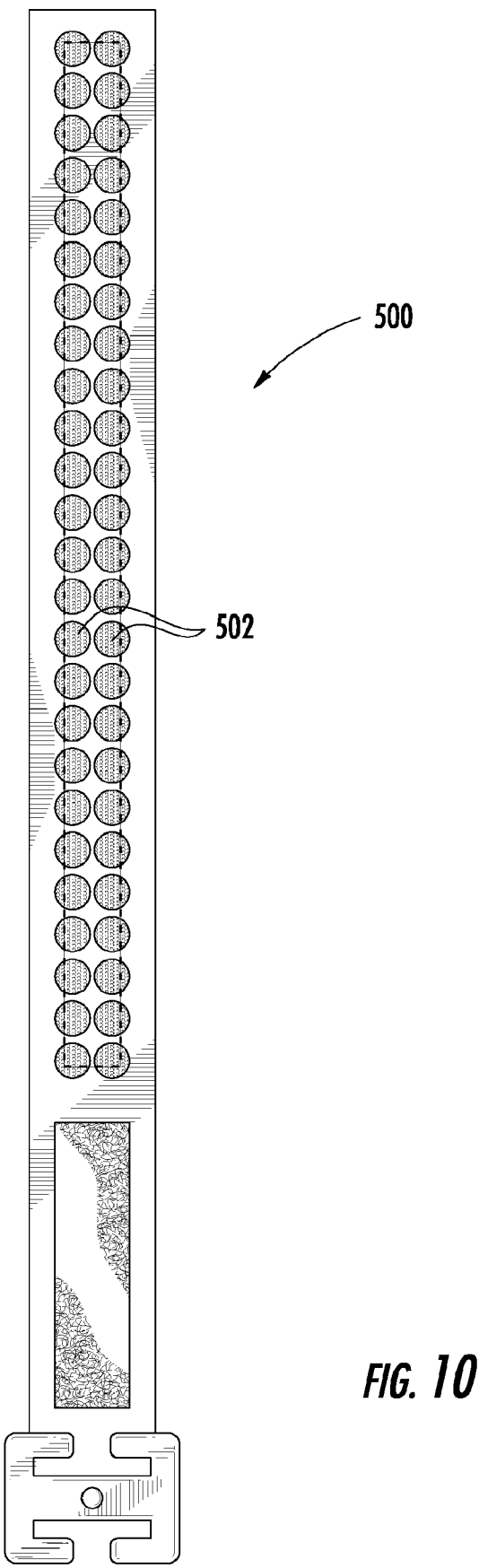
FIG. 10 is a further alternative embodiment of the seat belt positioning device in accordance with the present invention with two columns of round fasteners.

Referring now to FIGS. 6–10, top views of alternative embodiments 100, 200, 300, 400 and 500 of the seat belt positioning device of the present invention are shown. The operation of these alternative embodiments are substantially the same as the preferred embodiment 10 shown in FIGS. 1–5 but have different fastener arrangements and configurations. For example, FIG. 6 illustrates embodiment 100 with a single column of horizontally positioned rectangular fasteners 102 while FIG. 7 shows embodiment 200 with two columns of square fasteners 202 and FIG. 8 shows embodiment 300 with two columns of vertically positioned rectangular fasteners 302. Still further, FIG. 9 shows embodiment 400 with one column of round fasteners 402 and FIG. 10 shows embodiment 500 two columns of round fasteners 502.

The alternative embodiments 100, 200, 300, 400 and 500, shown in FIGS. 6–10, are installed as in the preferred embodiment as seen in FIG. 5 where a flap is routed under the shoulder belt to engage with the fasteners on the main portion of the elongated strap. The different sizes and configurations of the fasteners 102, 202, 302, 402 and 502, respectively, may be selected to accommodate different types and sizes of passenger restraint systems. Also, as stated above, hook and loop fastening material may be employed for the fasteners. In this case, each of the rows in the columns may alternate between hook and loop material so they complement each other when a flap is engaged. Further, the embodiments 200, 300 and 500 with two columns, the rows may alternative from hook material to loop material or they form a checkerboard array of hook material and loop material.

In view of the foregoing, a superior and unique seat belt positioning device 10, 100, 200, 300, 400 and 500 is provided. The device of the present invention is more comfortable and easier to adjust and position than prior art devices. Moreover, the present invention is more safe than prior art devices because it is much less prone to catching on clothing, and the like, while still being easy to install and operate.

It would be appreciated by those skilled in the art that various changes and modifications can be made to the illustrated embodiments without departing from the spirit of the present invention. All such modifications and changes are intended to be covered by the appended claims.

The invention claimed is:

1. An adjustable belt device for positioning a shoulder belt relative to a lap belt of a passenger restraint system, comprising:
   an elongated strap member having a first end, a second end and a face;
   a first fastening element attached to the first end of the elongated strap; the first fastening element being removably engageable with a lap belt of a passenger restraint system; the first fastening element being a plate pivotally affixed to the first end of the elongated strap; the plate having a pair of T-shaped opposing notches capable of threadebly receiving the lap belt therethrough;
   a series of fasteners having first and second groups of engaging fasteners disposed on the face of the elongated strap; the elongated strap being foldable so that said first group of engaging fasteners engage with said second group of engaging fasteners to form a loop with the lap belt captured and routed therethrough;
   whereby the position of the shoulder belt of the passenger restraint system is adjusted.

2. The adjustable belt device of claim 1, wherein the fasteners on the face of the elongated strap are self-engaging fasteners.

3. The adjustable belt device of claim 1, wherein the fasteners on the face of the elongated strap are hook and loop fasteners.

4. The adjustable belt device of claim 1, wherein the plate is made of metal.

5. The adjustable belt device of claim 1, further comprising a plurality of columns of fasteners on the face of the elongated strap.

6. The adjustable belt device of claim 5, wherein the fasteners are hook and look fasteners.

7. The adjustable belt device of claim 6, wherein the columns of fasteners include alternating pairs of hook and loop fastener material.

8. The adjustable belt device of claim 1, wherein the fasteners are rectangular in shape.

9. The adjustable belt device of claim 1, wherein the fasteners are square in shape.

10. The adjustable belt device of claim 1, wherein the fasteners are round in shape.

11. The adjustable belt device of claim 1, further comprising a length of loop fastening material affixed to the face of the elongated strap between the fasteners and the first fastening element.

* * * * *